(12) United States Patent
Schust

(10) Patent No.: US 7,731,019 B2
(45) Date of Patent: Jun. 8, 2010

(54) DOWNWARDLY CONVEYING CONVEYOR INSTALLATION

(75) Inventor: Bernhard Schust, Kressberg (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 11 days.

(21) Appl. No.: 12/093,368

(22) PCT Filed: Oct. 18, 2006

(86) PCT No.: PCT/EP2006/010028

§ 371 (c)(1),
(2), (4) Date: Jun. 27, 2008

(87) PCT Pub. No.: WO2007/054184

PCT Pub. Date: May 18, 2007

(65) Prior Publication Data

US 2008/0283367 A1 Nov. 20, 2008

(30) Foreign Application Priority Data

Nov. 12, 2005 (DE) .................. 10 2005 054 101

(51) Int. Cl.
*B65G 23/00* (2006.01)
(52) U.S. Cl. ...................... 198/832; 198/835
(58) Field of Classification Search ............... 198/832, 198/832.1, 832.2, 834, 835; 193/35 A
See application file for complete search history.

(56) References Cited

U.S. PATENT DOCUMENTS

| 3,871,147 | A | * | 3/1975 | Stegmeier | .................. 52/127.7 |
| 3,983,762 | A | * | 10/1976 | Dellner | ........................ 198/834 |
| 7,299,915 | B2 | * | 11/2007 | El-Ibiary | ..................... 198/835 |
| 7,510,073 | B2 | * | 3/2009 | Kanaris | ....................... 198/832 |
| 2003/0217909 | A1 | * | 11/2003 | Soldavini et al. | ............ 198/832 |

FOREIGN PATENT DOCUMENTS

| DE | 20 53 59 | 2/1959 |
| DE | 205359 | 2/1959 |
| DE | 1 098 828 | 7/1961 |
| DE | 1 475 479 | 7/1969 |
| DE | 1 573 455 | 3/1972 |
| DE | 41 22 002 | 8/1992 |
| DE | 102 55 038 | 4/2004 |
| GB | 1129998 | 10/1968 |
| GB | 1 172 021 | 11/1969 |
| GB | 2 257 102 | 1/1993 |

* cited by examiner

*Primary Examiner*—James R Bidwell
(74) *Attorney, Agent, or Firm*—Baker & Daniels LLP

(57) ABSTRACT

A downwardly conveying conveyor installation, such as belt-conveyor installation, for transporting the conveyable articles along a conveying path from a geodetically higher location to a geodetically lower location. There is provided a motor drive, and a hydrodynamic coupling comprising a drive-side pump wheel and an output-side turbine wheel, which together form a toroidal operating space which is filled with operating medium. The pump wheel and the turbine wheel each have a blade arrangement with a multiplicity of blades which are arranged opposite one another such that the blades of the pump wheel are flush with the blades of the turbine wheel. The blades of the pump wheel, as seen in a circumferentially directed section through the operating space, are positioned obliquely, in the direction from the rotor base to the blade tip, counter to the driving direction of rotation of the pump wheel, and the blades of the turbine wheel are positioned obliquely, in the direction from the rotor base to the blade tip, in the driving direction of rotation of the turbine wheel.

10 Claims, 1 Drawing Sheet

DOWNWARDLY CONVEYING CONVEYOR INSTALLATION

CROSS-REFERENCE TO RELATED APPLICATION

This application is related to and claims the benefit under 35 U.S.C. §119 and 35 U.S.C. §365 of International Application No. PCT/EP2006/010028, filed Oct. 18, 2006.

The invention relates to a downwardly conveying conveyor installation, in particular a belt conveyor installation, by means of which conveyable articles are conveyed from a geodetically higher location to a geodetically lower location.

Downwardly conveying conveyor installations, in which case a circulating web-like, chain-like or circular conveying means serves the purpose of receiving conveyable articles and transporting the conveyable articles in order to convey the conveyable articles down an incline have been known for a long time. For example such belt conveyor installations or conveyor belts are used in the mining industry below the ground.

The load state of such conveyor installations varies in dependency on its loading state, that is when the as a rule belt-shaped or band-shaped conveying means is loaded with conveyable articles the weight force brings about a generator operating state in which the weight force of the conveying means together with the load is sufficient to cause the conveying means to circulate. In this generator operating state the conveyor installation thus runs independently and an acceleration torque generated by the provided drive is to be considered unfavorable, since a correspondingly dimensioned additional brake mechanism must be provided in order to prevent excess speeds of the conveying means, which must also "brake" the acceleration torque generated by the drive.

On the other hand if the conveying means is not or is essentially not or is only partially loaded (for example only or predominantly on upwardly conveying sections), the acceleration torque from the motor drive is mandatory for the driving of the conveying means, since otherwise the conveying means at the least does not start or will not continue circulating independently.

It is further known to provide a hydrodynamic coupling with a pump wheel and a turbine wheel in the drive train of such conveyor installations, said hydrodynamic clutch and pump wheel and turbine wheel forming with each other a toroidal operating space in order to make the starting of the conveyor installation at least in the motor operating state as free of wear as possible.

The blades of the blade wheels, that is, of the pump wheel and of the turbine wheel, of such hydrodynamic couplings are as a rule flush with one another and are, seen in an axial section through the hydrodynamic coupling, vertically aligned on the rotor base or in the direction of the rotational axis of the hydrodynamic coupling.

In other areas of technology in which hydrodynamic couplings are used, for example in motor vehicles, it is known to position the blades of the pump wheel and turbine wheel—seen in circumferential direction through the operating space of the hydrodynamic coupling—obliquely, so that in the case of a first direction of rotation they are arranged flush to each other and in the case of a second direction of rotation opposed to the first direction of rotation, they are in spiking arrangement to each other. Through this oblique positioning it is achieved that the hydrodynamic coupling in its two directions of rotation exhibits a maximum transmittable torque deviating from each other. In the first direction of rotation, in which the blades of the pump wheel and the turbine wheel are in spiking arrangement to each other, the maximum transmittable torque is greater than in the second opposed direction of rotation, in which the blades of the pump wheel and the turbine wheel are in slanting arrangement to each other. This can for example help, in a load operation, in which case drive power or torque is being transmitted from the pump wheel to the turbine wheel, to increase the maximum transmittable torque and with it the maximum transmittable power in comparison to a straight bladed hydrodynamic coupling, whereas on the other hand in thrust operation, that is in operating states in which the turbine wheel circulates more rapidly than the pump wheel, an undesirable braking of the turbine wheel through the transmission of rotational power or torque from the turbine wheel to the pump wheel is prevented. The hydrodynamic coupling is therefore designed in such a way that the blades are in spiking arrangement to each other in the first named operating state "load operation", whereas on the other hand in the second named operating state "thrust operation" they are in slanting arrangement to each other.

The use of an obliquely bladed hydrodynamic coupling known in other areas of technology in the case of the above described conveyor installations would hence result in a particularly high torque being able to be transmitted from the drive to the conveying means in motor operating state, without however triggering the above described problem in the generator operating state.

Reference is made to the following documents for the published state of the art:

DE 102 55 038 A1
DE 15 73 455 C
DE 10 98 828 B
AT 205 359 B

Common to all of the publications is the fact that they show an oblique positioning of the blade arrangement of the pump wheel of a hydrodynamic coupling in the drive rotational direction.

The invention is based on the object of specifying a downwardly conveying conveyor installation in which case in the above described generator operating state 3a An undesirable transmitted acceleration torque from the drive to the conveying means is as low as possible.

The object in accordance with the invention is solved by a conveyor installation with the features of claim 1. The dependent claims describe advantageous and particularly practical embodiments of the invention.

According to the conveyor installation in accordance with the invention, which is designed in particular as a belt conveyor installation with a circulating belt or conveyor belt, an obliquely bladed hydrodynamic coupling is provided in the drive train between the motor drive and the conveying means that is loaded with the conveyable articles. Hence an at least nearly wear-free drive or a wear-free starting of the conveyor installation is made possible. The hydrodynamic coupling comprises, as is known, a pump wheel and a turbine wheel, which with one another form a toroidal operating space, which for torque or rotational power transmission is filled or can be filled with an operating medium. In particular a hydrodynamic coupling constantly filled with operating medium comes into consideration (a so-called constant coupling), advantageously such a coupling in which case a predetermined maximum quantity of operating medium is constantly located in the operating space. However, a hydrodynamic coupling can also be provided which along with the operating space comprises an additional reservoir for holding operating medium, so that the volumetric efficiency of the operating space can be varied by conducting of operating medium from the reservoir to the operating space or from the operating space to the reservoir. Finally, hydrodynamic couplings with an external operating medium circulation for filling and emptying the operating space come into consideration.

The pump wheel of the hydrodynamic coupling is in a drive connection (driving connection) with the motor drive, and the turbine wheel of the hydrodynamic coupling is in a drive connection (output connection) with the conveying means.

In contrast to the above described obliquely bladed hydrodynamic couplings the oblique position in accordance with the invention is designed in such a way that in the operating state in which the pump wheel circulates more rapidly than the turbine wheel, the blades of pump wheel and turbine wheel are in slanting arrangement to one another, whereas on the other hand in the operating state in which the turbine wheel circulates more rapidly than the pump wheel, the blades of the pump wheel and turbine wheel are in spiking arrangement to one another. It is true that this has the consequence that the maximum transmittable torque from the motor drive to the conveying means in comparison to a straight bladed hydrodynamic coupling, as has been used previously in downwardly conveying conveyor installations, and even more so in comparison to an opposed obliquely bladed hydrodynamic coupling is lessened. At the same time however this "wrong way around" designed obliquely positioned blade arrangement makes possible the transmission of a higher braking torque from the turbine wheel to the pump wheel in the so-called generator operating state, that is, in the operating state in which the turbine wheel circulates more rapidly than the pump wheel by virtue of the loading state of the conveying means, and in addition avoids the transmission of an undesirable great torque n the generator operating state of the pump wheel to the turbine wheel. One could also say that at the moment in which the conveyor installation switches from the motor operating state to generator operating state and the turbine wheel passes the pump wheel, the coupling characteristic becomes "sharp".

Even if in the motor operating state the transmission behavior of the hydrodynamic coupling is unfavorable with regard to its efficiency, through the selected, advantageously only slightly oblique positioning of the blades for example in the range of 1°-10° opposite the rotational axis of the hydrodynamic coupling, preferably in the range of 1°-5° or of 1°-3°, the acceleration support of the conveying means through the motor drive sufficing, in order to accelerate the empty or to a large extent empty or partially filled conveying means. There are also other oblique positionings possible, for example from up to 30°, 35° or 40° or 45°.

At the moment in which the conveying means, in particular the conveyor belt or the conveyor band, "passes" the drive, that is, the turbine wheel circulates more rapidly than the pump wheel, the hydrodynamic coupling intercepts this undesirable acceleration through its torque increase.

In particular when the operating space of the hydrodynamic coupling can be more or less filled by the feeding and draining of operating medium, through the described oblique position it is achieved that at least with a relatively high filling, in particular complete filling, of the operating space the torque transmitted by the pump wheel to the turbine wheel is sufficient to start the conveying means by means of the motor drive. In the generator operating state on the other hand the hydrodynamic coupling acts extremely "rigid" and even in the case of a low filling of the operating space protects the conveying means from an excess rate of speed.

Within the meaning of the present invention, downwardly conveying conveyor installation is not only understood to be conveyor installations which are conveyed downwardly over their entire conveyor path continuously, in particular constantly in the mathematical sense, but rather also those conveyor installations exhibiting sections in which they are conveyed upwardly. However, the end point of the conveyor installation however lies on a geodetically lower location than the starting point.

The invention will be exemplarily explained below with the help of an exemplary embodiment and the figures.

The figures show the following:

Figure 1:
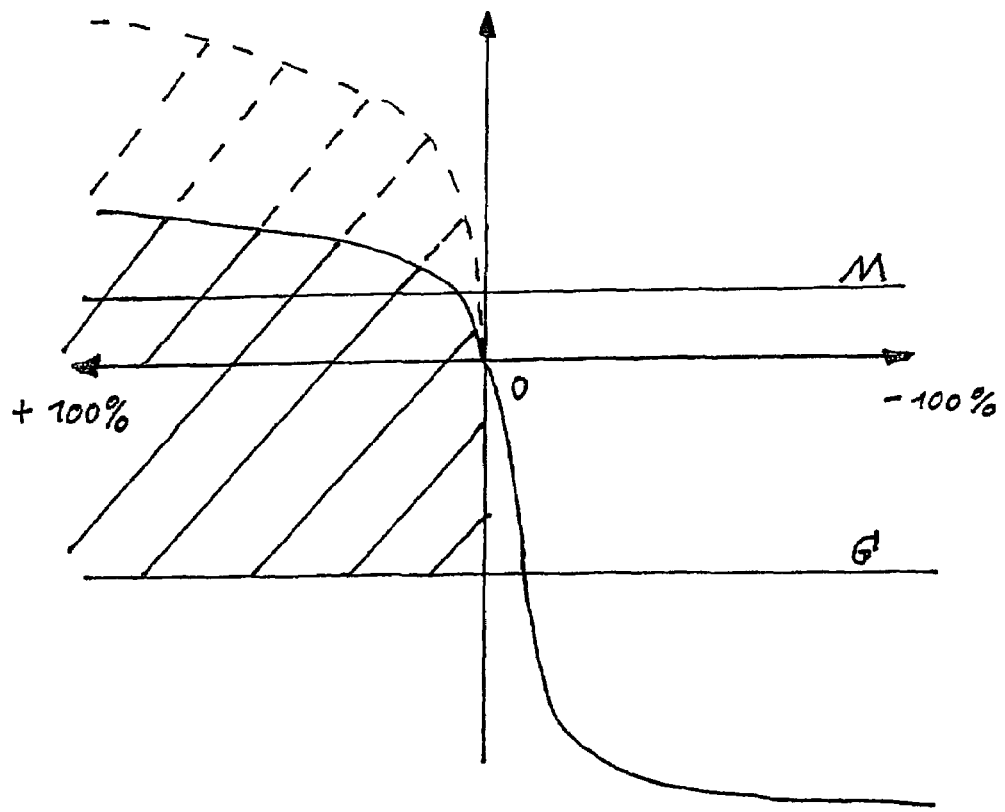
FIG. 1 shows an example of a coupling characteristic of a hydrodynamic coupling designed in accordance with the invention in a conveyor installation in comparison to the coupling characteristic of a straight bladed hydrodynamic coupling in such a conveyor installation.

In FIG. 1 one recognizes in solid line the asymmetrical characteristic curve of the hydrodynamic coupling in the conveyor installation in accordance with the invention and for comparison to this in a dashed line the left part of a symmetrical coupling characteristic curve in the case of a straight bladed hydrodynamic coupling. The characteristic curve of the oblique bladed hydrodynamic coupling provided in the conveyor installation in accordance with the invention is in the range of +100% slip, that is a state in which the pump wheel circulates at maximum speed and the turbine wheel is still, up to −100% slip, that is in a state in which the pump wheel is still and the turbine wheel circulates at maximum speed.

The horizontal lines M and G designate the torque to be applied by the motor drive, in order to start the empty conveying means (Line M) and the maximum acceleration torque applied by the conveying means loaded to maximum capacity with conveyable articles in the generator operating state (Line G).

The shaded part of the drawing denotes the combined maximum acceleration torque which arises through the acceleration torque of the self-driving conveying means loaded to maximum capacity together with the additional acceleration torque transmitted by the motor drive. As one recognized by comparison of the dashed with the solid shaded part of the drawing, the maximum acceleration torque with which the conveying means is driven by virtue of the weight force and through the drive via the hydrodynamic coupling is significantly greater in the case of a straight bladed hydrodynamic coupling than in the case of oblique bladed hydrodynamic coupling provided in accordance with the invention.

Figure 2:
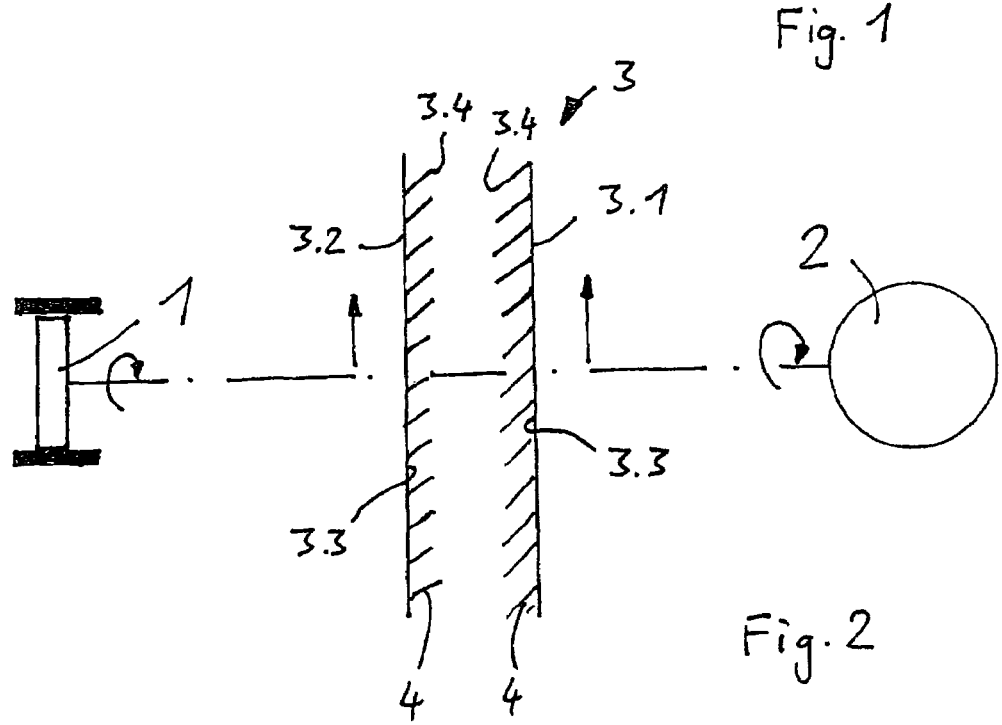
FIG. 2 shows a schematic representation of the oblique positioning of the blades of the pump wheel and turbine wheel.

In FIG. 2 one recognizes schematically the motor drive 2, which is in a drive connection to the pump wheel 3.1 of a hydrodynamic coupling. The turbine wheel 3.2 is in drive connection to the conveying means 1, for example a drive wheel of a conveyor belt or conveyor band.

The pump wheel 3.1 and the turbine wheel 3.2 each exhibit a plurality of blades 4, which are represented in FIG. 2 in a rolled out section in circumferential direction through the operating space of the hydrodynamic coupling. As one sees, the blades 4 are inclined opposite a vertical line on the rotor base 3.3 or of the rotational axis of the hydrodynamic coupling. The inclination is designed in such a way that the blades of the pump wheel 3.1 and turbine wheel 3.2 in the motor operating state, that is in the operating state in which the pump wheel 3.1 circulates more rapidly than the turbine wheel 3.2, is slanting, whereas on the other hand the blades 4 of the pump wheel 3.1 and the turbine wheel 3.2 are arranged in spiking mode when the turbine wheel 3.2 circulates more rapidly than the pump wheel 3.1, that is in a generator operating state.

Accordingly the blades of the pump wheel 3.1 in the portrayed section in the direction of the rotor base 3.3 to the blade tip 3.4 are inclined counter to the driving direction of rotation of the pump wheel 3.1 (see the arrow on the right next to the pump wheel), and the blades of the turbine wheel 3.2 are inclined from the rotor base 3.3 to the blade tip 3.4 in the driving direction of rotation of the turbine wheel 3.2 (see the arrow on the left next to the turbine wheel 3.2).

The invention claimed is:

1. A downwardly conveying conveyor installation, comprising:
    a circulating web-like, chain-like or circular conveyor for receiving conveyable articles and transporting the conveyable articles along a conveying path from a geodetically higher location to a geodetically lower location;
    a motor drive which causes the conveyor to circulate;
    a hydrodynamic coupling connected between the motor drive and conveyor comprising a drive-side pump wheel and an output-side turbine wheel, which together form a toroidal operating space which is filled, or can be filled, with operating medium;
    the pump wheel and the turbine wheel each having a blade arrangement with a multiplicity of blades which are arranged opposite one another such that the blades of the pump wheel are flush with the blades of the turbine wheel;
    the blades of the pump wheel, as seen in a circumferentially directed section through the operating space, are positioned obliquely, in the direction from a rotor base to the blade tip, counter to the driving direction of rotation of the pump wheel, and the blades of the turbine wheel are positioned obliquely, in the direction from a rotor base to the blade tip, in the driving direction of rotation of the turbine wheel;
    wherein the conveyor installation exhibits a first generator operating state with a conveyor loaded with conveyable articles in which, by virtue of its mass and the mass of the conveyable articles loaded thereupon, the turbine wheel circulates more rapidly through a weight force conditioned self-drive of the conveyor than the pump wheel and a second motor operating state with the conveyor being unloaded or to a great extent unloaded, in which state the pump wheel circulates more rapidly than the turbine wheel by virtue of the drive by the motor drive.

2. The conveyor installation according to claim 1, wherein the conveyor installation is a belt conveyor installation, and the conveyor is a circulating belt or a conveyor band.

3. The conveyor installation according to claim 1, wherein as seen in a circumferentially directed section through the operating space, the oblique positioning of the blades opposite the rotational axis of the hydrodynamic coupling lies in the range of 1-45°.

4. The conveyor installation according to claim 2, wherein as seen in a circumferentially directed section through the operating space, the oblique positioning of the blades opposite the rotational axis of the hydrodynamic coupling lies in the range of 1-45°.

5. The conveyor installation according to claim 1, wherein as seen in a circumferentially directed section through the operating space, the oblique positioning of the blades opposite the rotational axis of the hydrodynamic coupling lies in the range of 1-30°.

6. The conveyor installation according to claim 1, wherein as seen in a circumferentially directed section through the operating space, the oblique positioning of the blades opposite the rotational axis of the hydrodynamic coupling lies in the range of 1-10°.

7. The conveyor installation according to claim 1, wherein as seen in a circumferentially directed section through the operating space, the oblique positioning of the blades opposite the rotational axis of the hydrodynamic coupling lies in the range of 1-5°.

8. The conveyor installation according to claim 2, wherein as seen in a circumferentially directed section through the operating space, the oblique positioning of the blades opposite the rotational axis of the hydrodynamic coupling lies in the range of 1-30°.

9. The conveyor installation according to claim 2, wherein as seen in a circumferentially directed section through the operating space, the oblique positioning of the blades opposite the rotational axis of the hydrodynamic coupling lies in the range of 1-10°.

10. The conveyor installation according to claim 2, wherein as seen in a circumferentially directed section through the operating space, the oblique positioning of the blades opposite the rotational axis of the hydrodynamic coupling lies in the range of 1-5°.

* * * * *